(12) United States Patent  
Sun (10) Patent No.: US 12,124,125 B2  
(45) Date of Patent: Oct. 22, 2024

(54) DISPLAY PANEL AND ELECTRONIC DEVICE

(71) Applicant: TCL China Star Optoelectronics Technology Co., Ltd., Guangdong (CN)

(72) Inventor: Bo Sun, Guangdong (CN)

(73) Assignee: TCL China Star Optoelectronics Technology Co., Ltd., Shenzhen (CN)

(\*) Notice: Subject to any disclaimer, the term of this patent is extended or adjusted under 35 U.S.C. 154(b) by 0 days.

(21) Appl. No.: 17/779,610

(22) PCT Filed: May 13, 2022

(86) PCT No.: PCT/CN2022/092744  
§ 371 (c)(1),  
(2) Date: May 25, 2022

(87) PCT Pub. No.: WO2023/206627  
PCT Pub. Date: Nov. 2, 2023

(65) Prior Publication Data  
US 2024/0160062 A1    May 16, 2024

(30) Foreign Application Priority Data  
Apr. 27, 2022  (CN) .......................... 202210455567.2

(51) Int. Cl.  
*G02F 1/13357*  (2006.01)  
*G02F 1/1335*  (2006.01)  
*G02F 1/1339*  (2006.01)

(52) U.S. Cl.  
CPC .. *G02F 1/133603* (2013.01); *G02F 1/133528* (2013.01); *G02F 1/1339* (2013.01)

(58) Field of Classification Search  
CPC ........... G02F 1/13336; G02F 1/133388; G02F 1/133603; G02F 1/133528; G02F 1/1339  
See application file for complete search history.

(56) References Cited

U.S. PATENT DOCUMENTS

| | | |
|---|---|---|
| 2013/0176352 A1 | 7/2013 | Watanabe |
| 2014/0125875 A1 | 5/2014 | Momonoi et al. |

(Continued)

FOREIGN PATENT DOCUMENTS

| | | |
|---|---|---|
| CN | 114038340 | 2/2011 |
| CN | 105044964 | 11/2015 |

(Continued)

OTHER PUBLICATIONS

English translation for CN-111653207-A, Wu (Year: 2020).*

(Continued)

*Primary Examiner* — Jonathan Y Jung (57) ABSTRACT

The present application provides a display panel and an electronic device, the display panel includes at least two sub-boards spliced to each other, and each of the sub-boards includes a first display area and a second display area disposed at a periphery of the first display area, wherein a plurality of light-emitting devices are arranged on the first substrate or the second substrate corresponding to the second display area, and the plurality of light-emitting devices can enable the second display area to display a picture, so as to eliminate splicing gaps at splicing positions, thereby alleviating the technical problem of the splicing gaps in existing liquid crystal display splicing screens.

20 Claims, 5 Drawing Sheets

(56) References Cited

U.S. PATENT DOCUMENTS

| | | | | |
|---|---|---|---|---|
| 2015/0261046 A1* | 9/2015 | Miki | ................ | G02F 1/134309 349/42 |
| 2016/0161088 A1* | 6/2016 | Sung | .................... | H01L 33/502 362/97.1 |
| 2018/0173036 A1* | 6/2018 | Kim | .................. | G02F 1/133524 |
| 2019/0137806 A1* | 5/2019 | Kong | .................... | G02F 1/1341 |
| 2019/0324319 A1* | 10/2019 | Park | ...................... | G02F 1/1339 |

FOREIGN PATENT DOCUMENTS

| | | | | |
|---|---|---|---|---|
| CN | 105044964 A | * | 11/2015 | |
| CN | 111653207 | | 9/2020 | |
| CN | 111653207 A | * | 9/2020 | ....... G02F 1/133528 |
| CN | 211826840 | | 10/2020 | |
| CN | 113376883 | | 9/2021 | |
| CN | 113703211 | | 11/2021 | |
| CN | 113990209 | | 1/2022 | |
| CN | 114217467 | | 3/2022 | |
| JP | 2003-215573 | | 7/2003 | |
| JP | 2004-191487 | | 7/2004 | |
| JP | 2007-192977 | | 8/2007 | |
| JP | 2016-035571 | | 3/2016 | |
| JP | 2017-009770 | | 1/2017 | |

OTHER PUBLICATIONS

English translation forCN-105044964-A, Wu (Year: 2015).*
International Search Report and the Written Opinion Dated Dec. 15, 2022 From the International Searching Authority Re. Application No. PCT/CN2022/092744. and its Translation Into English. (18 Pages).
Notification of Office Action and Search Report Dated Jun. 3, 2023 From The State Intellectual Property Office of the People's Republic of China Re. Application No. 202210455567.2 and its Translation Into English. (17 Pages).
Notification of Office Action and Search Report Dated Jun. 3, 2024 From the State Intellectual Property Office of the People's Republic of China Re. Application No. 2022-530286 and its Translation into English. (14 Pages).

* cited by examiner

DISPLAY PANEL AND ELECTRONIC DEVICE

RELATED APPLICATIONS

This application is a National Phase of PCT Patent Application No. PCT/CN2022/092744 having International filing date of May 13, 2022, which claims the benefit of priority of Chinese Patent Application No. 202210455567.2 filed on Apr. 27, 2022. The contents of the above applications are all incorporated by reference as if fully set forth herein in their entirety.

FIELD AND BACKGROUND OF THE INVENTION

The present application relates to the field of display technology, and in particular, to a display panel and an electronic device.

As the current mainstream display screen, a liquid crystal display (LCD) screen has advantages of low cost and mature technology. Meanwhile, with development of display technology, in order to adapt to a variety of application scenarios, liquid crystal displays such as special-shaped displays and super-large splicing displays have appeared. The existing LCD splicing screen is formed by splicing a plurality of sub-display screens, but each of the sub-display screens has a frame, so that splicing gaps are present at splicing positions between adjacent ones of the sub-display screens of the LCD splicing screen.

SUMMARY OF THE INVENTION

The present application provides a display panel and an electronic device to alleviate the technical problem of splicing gaps in existing liquid crystal display splicing screens.

In order to solve the above-mentioned problems, the technical solutions provided by this application are as follows:

An embodiment of the present application provides a display panel, which includes display panel, including at least two sub-boards spliced to each other, wherein each of the sub-boards includes a first display area and a second display area arranged at a periphery of the first display area; and each of the sub-boards further includes:
a first substrate;
a second substrate disposed opposite to the first substrate;
a liquid crystal layer disposed between the first substrate and the second substrate, wherein the liquid crystal layer is disposed corresponding to the first display area;
a plurality of light-emitting devices disposed on one of the first substrate and the second substrate and located in the second display area; and
a frame sealant disposed between the first substrate and the second substrate, wherein the frame sealant surrounds the liquid crystal layer.

In the display panel provided by the embodiment of the present application, a pixel density of the first display area is equal to a pixel density of the second display area.

In the display panel provided by the embodiment of the present application, the first display area is provided with a plurality of first pixels, each of the first pixels includes at least three first sub-pixels with different colors; the second display area is provided with a plurality of second pixels, each of the second pixels includes at least three second sub-pixels with different colors, and an interval between adjacent ones of the second sub-pixels in a same one of the second pixels is equal to an interval between adjacent ones of the first sub-pixels in a same one of the first pixels.

In the display panel provided by the embodiment of the present application, the plurality of light-emitting devices are disposed on the first substrate, and the second substrate is provided with notches at positions corresponding to the light-emitting devices, and the light-emitting devices extend from the first substrate into the notches.

In the display panel provided by the embodiment of the present application, the frame sealant is a transparent frame sealant, and the transparent frame sealant covers the plurality of light-emitting devices and is accommodated in the notches.

In the display panel provided by the embodiment of the present application, a transmittance of the frame sealant is greater than 60%.

In the display panel provided by the embodiment of the present application, the sub-boards further include an upper polarizer located on a side of the second substrate away from the first substrate, a lower polarizer located on a side of the first substrate away from the second substrate, an edge of the upper polarizer is flush with an edge of the second substrate, and an edge of the lower polarizer is flush with an edge of the first substrate.

In the display panel provided by the embodiment of the present application, each of the light-emitting devices has a first pole and a second pole; and the first substrate includes:
a first base;
a thin film transistor disposed on the first base and located in the first display area; and
a drive circuit disposed on the first base and located in the second display area, wherein the drive circuit includes a first electrode and a second electrode, and the first electrode and the second electrode are arranged in a same layer with at least part of metal layers of the thin film transistor; and
wherein the first electrode is electrically connected to the first pole of each of the light-emitting devices, and the second electrode is electrically connected to the second pole of each of the light-emitting devices.

In the display panel provided by the embodiment of the present application, the first substrate further includes a color resist layer, the color resist layer is disposed on the first base, the second substrate further includes a common electrode, and the common electrode is disposed on the second substrate and located in the first display area.

An embodiment of the present application further provides an electronic device, which includes a housing and a display panel according to one of the preceding embodiments, the housing is formed with a first accommodating cavity, and the display panel is assembled in the first accommodating cavity.

In the display panel and the electronic device provided by the present application, the display panel includes at least two sub-boards spliced to each other, each of the sub-boards includes a first display area and a second display area disposed at the periphery of the first display area. Each of the sub-boards further includes a first substrate and a second substrate disposed opposite to each other, and a frame sealant and a liquid crystal layer located between the first substrate and the second substrate, the frame sealant surrounds the liquid crystal layer, wherein a plurality of light-emitting devices are arranged on the first substrate or the second substrate corresponding to the second display area, and the plurality of light-emitting devices can allow the second display area to display a picture, so as to eliminate the splicing gaps at the splicing positions, thus solving the problem of splicing gaps in the display splicing screens of the existing liquid crystal.

BRIEF DESCRIPTION OF THE SEVERAL VIEWS OF THE DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DESCRIPTION OF SPECIFIC EMBODIMENTS OF THE INVENTION

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the drawings, structurally similar elements are denoted by the same reference numerals. In the drawings, the thickness of some layers and regions is exaggerated for clear understanding and ease of description. That is, the size and thickness of each component shown in the drawings are arbitrarily shown, but the application is not limited thereto.

Figure 1:
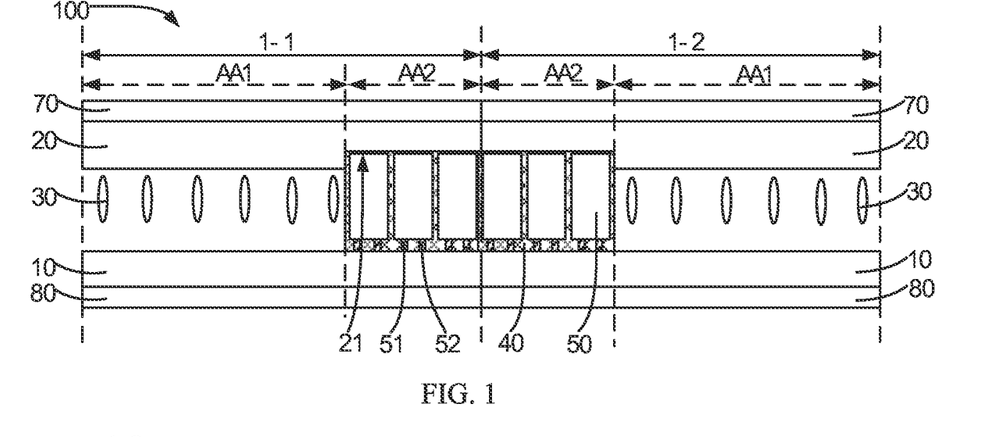
FIG. 1 is a schematic cross-sectional structure diagram of a display panel provided by an embodiment of the present application.
Figure 2:
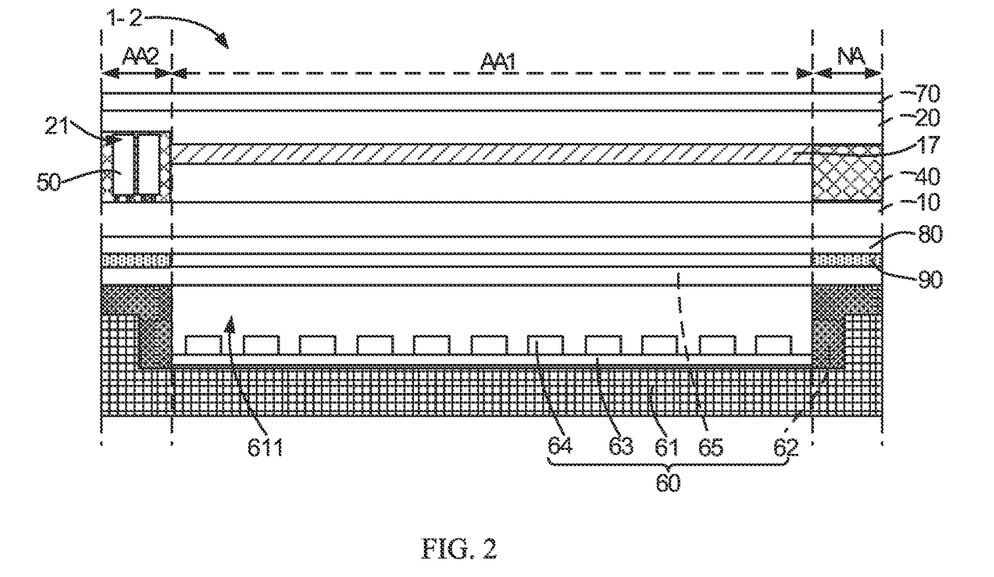
FIG. 2 is a schematic cross-sectional structure diagram of a sub-board provided by an embodiment of the present application.
Figure 3:
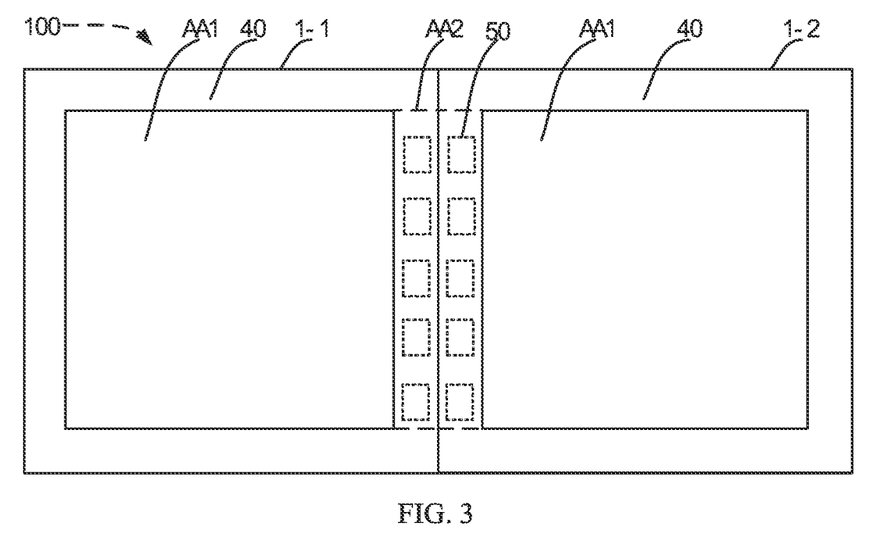
FIG. 3 is a schematic top-view structure diagram of the display panel provided by an embodiment of the present application.
Figure 4:
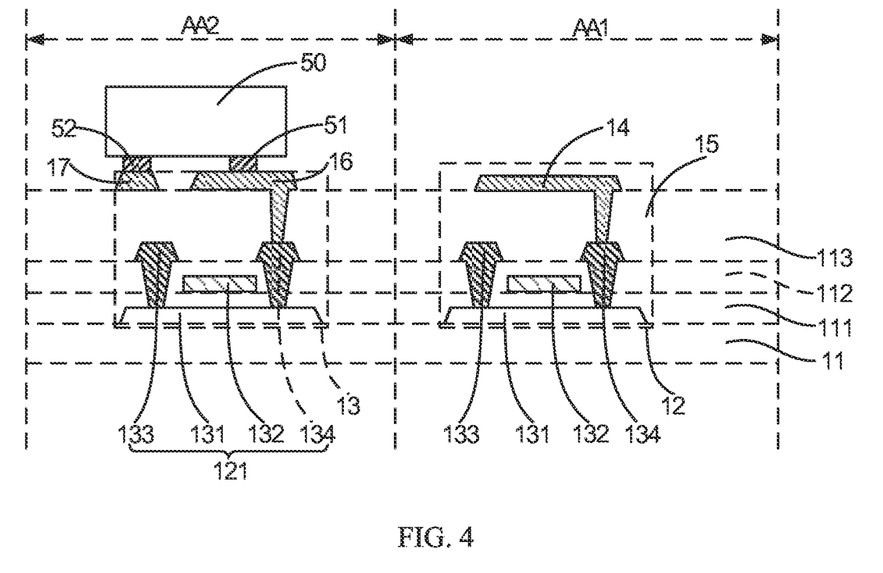
FIG. 4 is a schematic diagram of a detailed structure of a first substrate provided by an embodiment of the present application.
Figure 5:
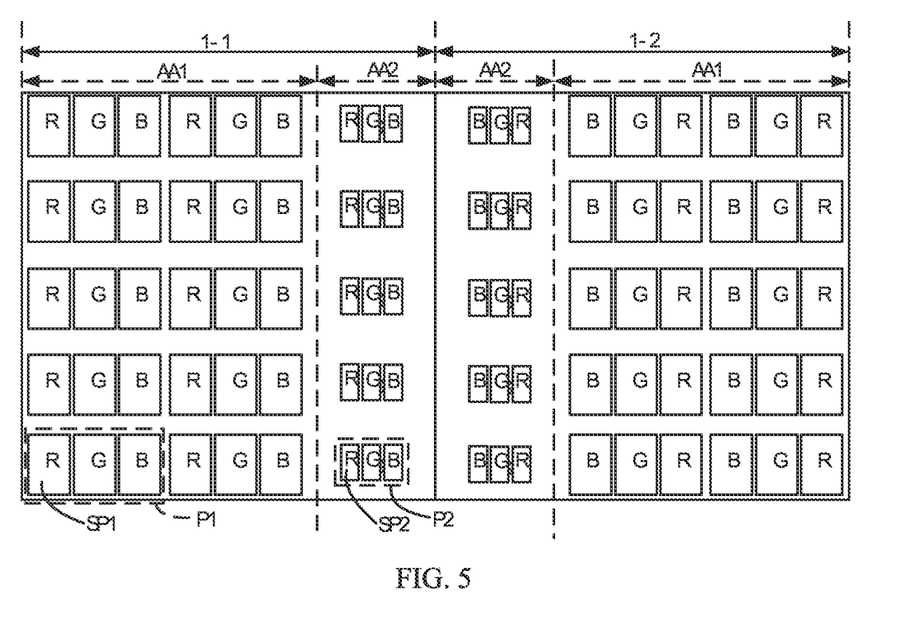
FIG. 5 is a schematic diagram of an arrangement structure of pixels on the display panel according to an embodiment of the present application.

Referring to FIGS. 1 to 5, FIG. 1 is a schematic cross-sectional structure diagram of a display panel provided by an embodiment of the present application, FIG. 2 is a schematic cross-sectional structure diagram of a sub-board provided by an embodiment of the present application, FIG. 3 is a schematic top-view structure diagram of the display panel provided by an embodiment of the present application, FIG. 4 is a schematic diagram of a detailed structure of a first substrate provided by an embodiment of the present application, and FIG. 5 is a schematic diagram of an arrangement structure of pixels on the display panel according to an embodiment of the present application. The display panel 100 includes at least two sub-boards spliced to each other. As shown in FIG. 1, the two sub-boards that are spliced to each other are respectively a first sub-board 1-1 and a second sub-board 1-2. Each of the sub-board includes a first display area AA1 and a second display area AA2 disposed at a periphery of the first display area AA1, wherein the second display areas AA2 of adjacent ones of the sub-boards are abutted against each other.

The first display area AA1 and the second display area AA2 are both used for displaying pictures. In two of the sub-boards that are spliced to each other, the second display area AA2 of the first sub-board 1-1 and the second display areas AA2 of the second sub-board 1-2 are spliced together, and display images together with the first display areas AA1 of the two sub-boards spliced with each other. Due to the existence of the second display areas AA2, the splicing positions of the two sub-boards spliced to each other can also display the picture, eliminating the splicing gaps at the splicing positions, thereby solving the problem of splicing gaps in the existing LCD splicing screen.

The following will specifically describe how to make the second display area AA2 realize screen display:

Specifically, as shown in FIG. 1, each of the sub-boards further includes a first substrate 10, a second substrate 20 disposed opposite to the first substrate 10, the liquid crystal layer 30 and the frame sealant 40 located between the first substrate 10 and the second substrate 20, and the plurality of light-emitting devices 50 disposed on the first substrate 10 or the second substrate 20. In the embodiment of the present application, the plurality of the light-emitting devices 50 disposed on the first substrate 10 is taken as an example. The liquid crystal layer 30 is disposed corresponding to the first display area AA1, the frame sealant 40 surrounds the liquid crystal layer 30, and at least part of the frame sealant 40 is located in the second display area AA2. The plurality of the light-emitting devices 50 are positioned opposite to the frame sealant 40 in the second display area AA2.

Optionally, the first substrate 10 is an array substrate, and the second substrate 20 is a color filter substrate, but the present application is not limited thereto. The first substrate 10 of the present application may also be gate-driver-on-array (GOA) substrate. Each of the sub-boards further includes a backlight module 60 located on a side of the array substrate away from the color filter substrate, and the backlight module 60 is configured to provide backlight for the sub-board.

The first substrate 10 is provided with a first control circuit, the first control circuit controls the deflection of the liquid crystal molecules of the liquid crystal layer 30, and the deflected liquid crystal molecules refract the backlight provided by the backlight module 60 to the second substrate 20, a color filter is provided on the second substrate 20, and the color filter enables the backlight to present different colors after passing through the second substrate 20, so as to realize the picture display of the first display area AA1, and then realize color display of the sub-board.

Specifically, as shown in FIG. 2, taking the second sub-board 1-2 as an example, the backlight module 60 includes a backboard 61 and a plastic frame 62 fixedly connected to the backboard 61. The backboard 61 and the plastic frame 62 form a first accommodating cavity 611 together. The backlight module 60 further includes a light-emitting light source 64 located in the first accommodating cavity 611. The light-emitting light source 64 can be arranged in a direct type or an edge type. In the embodiment of the present application, taking the direct type of the light-emitting light source 64 as an example, in order to improve the utilization rate of the light emitted by the light-emitting light source 64, a reflection sheet 63 may be provided on the side of the light-emitting light source 64 away from the first substrate 10. Optionally, the backplane 61 may be a metal backplane 61, such as sheet metal, to improve the heat dissipation effect of the backlight module 60 and to better dissipate the heat generated by the light-emitting light source 64. Of course, the backlight module 60 further includes an optical film 65 and so on located above the light-emitting light source 64, and the optical film 65 includes a diffuser, a brightness enhancement film, and the like.

Further, the optical film 65, the reflection sheet 63, the light-emitting light source 64, etc. are all fixedly connected with the plastic frame 62, so that the plastic frame 62 supports and fixes the optical film 65, the reflective sheet 63, the light-emitting light source 64, and the like. Meanwhile, the plastic frame 62 is also configured to support and fix the first substrate 10 and the second substrate 20. Specifically, the first substrate 10 is fixedly connected to the optical film 65 on the plastic frame 62 through an adhesive material such as foam glue 90, so that the first substrate 10 and the second substrate 20 and the backlight module 60 are fixed together, and thereby the plastic frame 62 of the backlight module 60 supports and fixes the first substrate 10 and the second substrate 20.

It is appreciated that, due to the existence of the plastic frame 62 and the foam glue 90 of the backlight module 60, and the opaque properties of the plastic frame 62 and the foam glue 90, the light emitted by the light-emitting light source 64 in the backlight module 60 cannot pass through the plastic frame 62 and the foam glue 90, so that the area covered by the plastic frame 62 and the foam glue 90 has no light to pass through, and the area covered by the plastic frame 62 and the foam glue 90 cannot be used for display, and is defined as the non-display area NA of the sub-boards.

However, in the present application, a plurality of the light-emitting devices 50 are arranged on the first substrate 10, and the plurality of the light-emitting devices 50 correspond to the area covered by the plastic frame 62 and the foam glue 90 of the backlight module 60. The plurality of the light-emitting devices 50 can emit light so that the area covered by the plastic frame 62 and the foam glue 90 can also display images, so as to form the second display area AA2.

Referring to FIGS. 2 and 3, the setting area of the frame sealant 40 corresponds to the area covered by the plastic frame 62 and the foam glue 90, and the frame sealant 40 in the second display area AA2 covers the plurality of light-emitting devices 50. After two of the sub-boards are spliced to each other, the second display areas AA2 of the two sub-boards are abutted against each other, so that the area between the first display areas AA1 of the two sub-boards that are spliced to each other can also display images, which eliminates splicing gaps at the splicing positions.

Of course, in order to realize the narrow bezel or no bezel of the display panel 100, the light-emitting devices 50 can also be arranged in the entire area covered by the plastic frame 62 and the foam glue 90, that is, the light-emitting devices 50 are arranged in the entire area covered by the frame sealant 40, and not limited to being arranged on the splicing sides of the sub-boards. For example, the light-emitting devices 50 can also be disposed on opposite sides of the splicing sides of the sub-boards and on the two sides between the opposite sides of the splicing sides of the sub-boards, so as to eliminate the non-display area NA of the sub-boards, thereby enabling the display panel 100 to realize a narrow bezel or no bezel.

Optionally, the light-emitting devices 50 include LED chips, and for example, each of the light-emitting devices 50 is a Micro LED chip or a Mini LED chip, etc. The light-emitting devices 50 are bound on the first substrate 10, and the first substrate 10 drives the light-emitting devices 50 to emit light. Specifically, bonding pads are provided on a side of the light-emitting devices 50 close to the first substrate 10, and each of the bonding pads includes a first pole 51 and a second pole 52 that are insulated from each other. The bonding pads of the light-emitting devices 50 are soldered on the first substrate 10 by a soldering material such as solder paste to realize the bonding between the light-emitting devices 50 and the first substrate 10. The frame sealant 40 covers a plurality of the light-emitting devices 50 to protect the light-emitting devices 50 and prevent the bonding pads of the light-emitting devices 50 from being corroded. In this way, no additional process is required to package the light-emitting devices 50. Of course, the present application is not limited thereto, and the encapsulation structure of the light-emitting devices 50 described in the present application may also be provided separately, not in the same layer as the frame sealant 40.

Further, the frame sealant 40 is a transparent frame sealant, including small resin molecules (e.g., acrylic resin, epoxy resin), UV light curing initiator, thermal curing initiator, inorganic filler, and the like. After UV light curing, the UV light curing initiator polymerizes part of the acrylic resin small molecules to form acrylic resin macromolecules, so that the frame sealant 40 is basically shaped and a certain adhesive force is formed. Thermal curing process is then carried out, and the thermal curing initiator causes the epoxy resin to undergo a polymerization reaction to form macromolecules. During thermal process, some unreacted acrylic resin small molecules will also undergo a polymerization reaction to form macromolecules, so that the frame sealant 40 generates a stronger adhesive force, so that the first substrate 10 and the second substrate 20 are tightly bonded together. The frame sealant 40 thus formed has high light transmittance. For example, the transmittance of the frame sealant 40 is greater than 60%, so as to improve the utilization rate of the light emitted by the light-emitting devices 50.

In addition, the gap between the first substrate 10 and the second substrate 20 is very small. In order to avoid interference between the second substrate 20 and the light-emitting devices 50, the positions of the second substrate 20 corresponding to the light-emitting devices 50 are provided with notches 21, the light-emitting devices 50 extends from the first substrate 10 into the notches 21, and the frame sealant 40 covers the plurality of light-emitting devices 50 and is accommodated in the notches 21. Optionally, the notches 21 on the second substrate 20 may be formed by thinning the second substrate 20 by means of laser cutting, grinding, or chemical etching.

The first substrate 10 is also provided with a second control circuit, the second control circuit is configured to control the light-emitting devices 50 to emit light, and the second control circuit and the first control circuit are formed under the same process conditions. Specifically, as shown in FIG. 4, the first substrate 10 includes a first base 11, a thin film transistor 12, and a drive circuit 13 disposed on the first base 11. The thin film transistor 12 is located in the first display area AA1 to serve as the first control circuit; the drive circuit 13 is located in the second display area AA2 and is electrically connected to the light-emitting devices 50 to serve as the second control circuit.

Specifically, the thin film transistor 12 is disposed on the first base 11, and the first base 11 includes a glass substrate or the like. The thin film transistor 12 includes an active layer 131, a gate electrode 132, a source electrode 133 and a drain electrode 134 and a pixel electrode 14. The first substrate 10 further includes a gate insulating layer 111 between the active layer 131 and the gate electrode 132, the interlayer insulating layer 112 between the gate electrode 132 and the source electrode 133 and the drain electrode 134, and the passivation layer 113 between the source electrode 133 and the pixel electrode 14.

Specifically, the active layer 131 is located on the first base 11, and the gate insulating layer 111 covers the active layer 131 and the first base 11. The gate 132 is disposed on the gate insulating layer 111 and is disposed corresponding to the channel region of the active layer 131. The interlayer insulating layer 112 covers the gate electrode 132 and the gate insulating layer 111, the source electrode 133 and the drain electrode 134 are disposed on the interlayer insulating layer 112, and the source electrode 133 and the drain electrode 134 are disposed on the interlayer insulating layer 112. The source electrode 133 and the drain electrode 134 are respectively connected to opposite sides of the channel region of the active layer 131. The passivation layer 113 covers the source electrode 133, the drain electrode 134, and the interlayer insulating layer 112. The pixel electrode 14 is disposed on the passivation layer 113, the pixel electrode 14 is a patterned electrode, and the pixel electrode 14 is electrically connected to the drain electrode 134 of the thin film transistor 12. However, the structure of the thin film transistor 12 described in the present application is not limited thereto. For example, the thin film transistor 12 may also adopt a structure such as a bottom gate or a double gate.

In order to control the deflection of liquid crystal molecules of the liquid crystal layer 30, the display panel 100 further includes a common electrode 15 located on the second substrate 20, the common electrode 15 is located in the first display area AA1 and faces the first substrate 10. In this way, the driving voltage on the pixel electrode 14 is controlled by the thin film transistor 12, so that an electric field is formed between the pixel electrode 14 and the common electrode 15, and the liquid crystal molecules of the liquid crystal layer 30 are deflected, thereby realizing the screen display of the first display area AA1.

Further, the drive circuit 13 is also disposed on the first base 11 and located in the second display area AA2. The drive circuit 13 includes a first electrode 16 and a second electrode 17, the first electrode 16 is electrically connected to the first pole 51 of the light-emitting devices 50, and the second electrode 17 is electrically connected to the second pole 52 of the light-emitting devices 50. In this way, the first electrode 16 is controlled by the drive circuit 13 to control the light-emitting devices 50 to emit light, thereby realizing the screen display of the second display area AA2.

Optionally, the first electrode 16 and the second electrode 17 are disposed in the same layer as at least part of the metal layer of the thin film transistor 12. For example, the first electrode 16 and the second electrode 17 are arranged in the same layer as the pixel electrode 14. Of course, optionally, the control method of the second control circuit may also adopt a control method similar to that of the first control circuit. Specifically, the drive circuit 13 further includes a drive device 121, and the drive device 121 may have substantially the same structure as the thin film transistor 12. One of the first electrode 16 and the second electrode 17 is electrically connected to the drive device 121, and the drive device 121 is configured to provide a drive signal to the first electrode 16 or the second electrode 17.

It should be noted that the common electrode 15 of the present application is not limited to be disposed on the second substrate 20. For example, the common electrode 15 can also be disposed on the first substrate 10, but needs to be insulated from the pixel electrode 14. In addition, the common electrode 15 can also be disposed in a different layer from the pixel electrode 14, or the common electrode 15 can also be disposed in the same layer as the pixel electrode 14. In addition, "disposed in the same layer" in this application means that in the preparation process, the layer formed of the same material is patterned to obtain at least two different structures, and the at least two different structures are arranged in the same layer. For example, if the first electrode 16 and the pixel electrode 14 in this embodiment are obtained by patterning the same conductive layer, the first electrode 16 and the pixel electrode 14 are provided in the same layer.

It is appreciated that, since the display modes of the first display area AA1 and the second display area AA2 are different, in order to make the optical tastes of the first display area AA1 and the second display area AA2 close to each other, the pixel density of the first display area AA1 is equal to the pixel density of the second display area AA2. The pixel density refers to the number of pixels distributed in a unit area.

Further, as shown in FIG. 5, the first display area AA1 is provided with a plurality of first pixels P1, and each of the first pixels P1 includes at least three first sub-pixels SP1 with different colors (the three first sub-pixels SP1 with different colors are R, G, and B). The second display area AA2 is provided with a plurality of second pixels P2, and each of the second pixels P2 includes at least three second sub-pixels SP2 with different colors (the three second sub-pixels SP2 with different colors are R, G, and B). The interval between adjacent ones of the second sub-pixels SP2 in the same second pixel P2 is equal to the interval between adjacent ones of the first sub-pixels SP1 in the same first pixel P1, in order to make the optical tastes of the first display area AA1 and the second display area AA2 close to each other.

It should be noted that the size and arrangement of the first sub-pixel SP1 can be characterized by the size and arrangement of the pixel electrode 14, and one of the pixel electrodes 14 corresponds to one of the first sub-pixels SP1. The size and arrangement of the second sub-pixel SP2 can be characterized by the size and arrangement of the light-emitting devices 50, and one of the light-emitting devices 50 corresponds to one of the second sub-pixels SP2. The color display of the first pixel P1 can be realized by a color filter on the second substrate 20, and the color display of the second pixel P2 can be realized by making the light-emitting devices 50 emit light of different colors. For example, each of the second pixels P2 may include three of the light-emitting devices 50, and the three light-emitting devices 50 emit red light, blue light, and green light, respectively.

In addition, in order to realize the display of the display panel 100, each of the sub-boards further includes an upper polarizer 70 located on the side of the second substrate 20 away from the first substrate 10 and a lower polarizer 80 located on one side of the first substrate 10 away from the second substrate 20, the edge of the upper polarizer 70 is flush with the edge of the second substrate 20, the edge of the lower polarizer 80 is flush with the edge of the first substrate 10, so that the upper polarizer 70 and the lower polarizer 80 cover the first display area AA1 and the second display area AA2, and the first display area AA1 and the second display area AA2 have close optical taste. Meanwhile, the upper polarizer 70 and the lower polarizer 80 on the two sub-boards are abutted against each other at the splicing position of the two sub-boards that are spliced to each other, reducing the visual difference of the two sub-boards that are spliced to each other.

Figure 6:
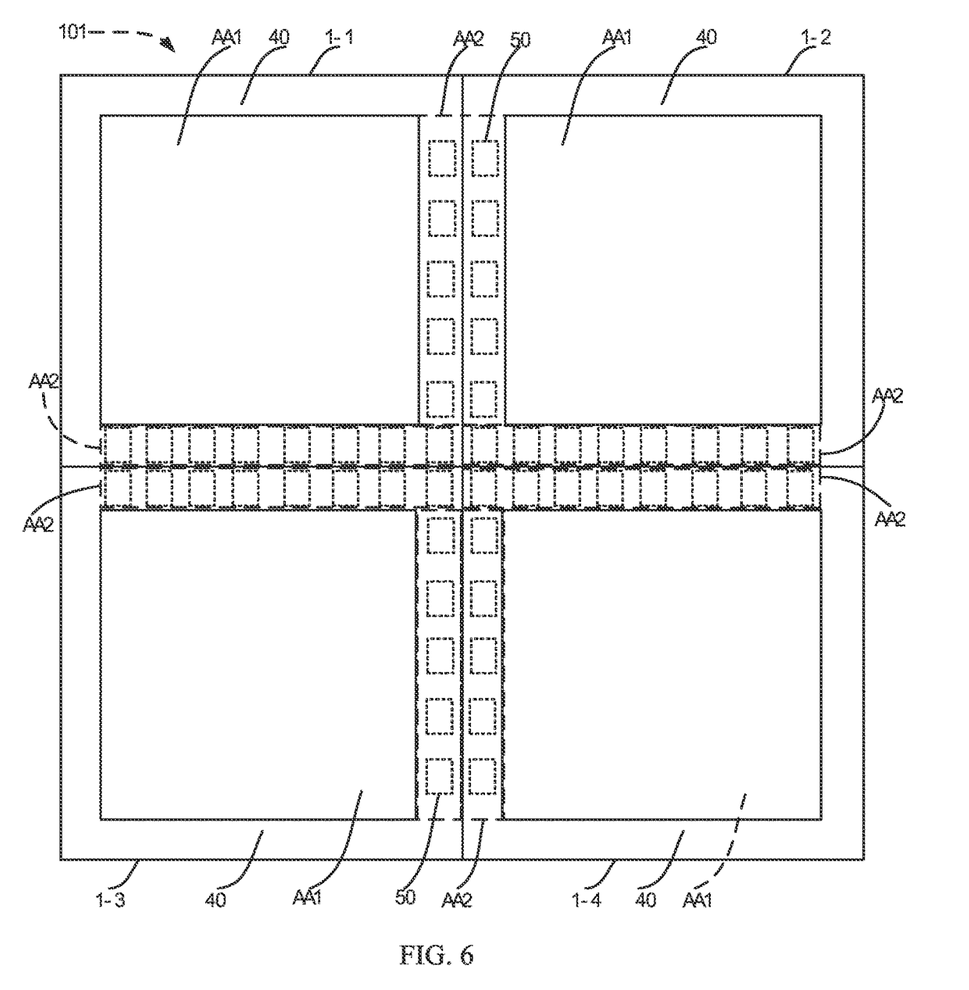
FIG. 6 is another schematic top-view structure diagram of the display panel provided by an embodiment of the present application.

In one embodiment, referring to FIG. 1 to FIG. 6 in combination, FIG. 6 is another schematic top-view structure diagram of the display panel provided by the embodiment of the present application. Different from the above embodiment, the display panel 101 includes four sub-boards spliced with each other, and the four sub-boards are the first sub-board 1-1, the second sub-board 1-2, the third sub-board 1-3, and the fourth sub-board 1-4, wherein the first sub-board 1-1 is spliced with the second sub-board 1-2 and the third sub-board 1-3 at the same time, the second sub-board 1-2 is spliced with the first sub-board 1-1 and the fourth sub-board 1-4 at the same time, and the third sub-board 1-3 is also spliced with the fourth sub-board 1-4.

A plurality of the light emitting devices 50 are arranged in the setting area of the frame sealant 40 at the splicing positions where the first sub-board 1-1, the second sub-board 1-2, the third sub-board 1-3, and the fourth sub-board 1-4 are spliced to each other, so that each of the first sub-board 1-1, the second sub-board 1-2, the third sub-board 1-3, the first sub-board 1-3, and the four sub-boards 1-4 has two of the second display areas AA2, thereby eliminating the splicing gaps at the splicing positions between first sub-board 1-1, the second sub-board 1-2, the third sub-board 1-3, and the fourth sub-boards 1-4 which are spliced to each other. Other descriptions can be referred to the above-mentioned embodiments, which will not be repeated herein for brevity.

In an embodiment, referring to FIG. 1 to FIG. 7 in combination, FIG. 1 is a schematic diagram of another cross-sectional structure of the display panel provided by the embodiment of the present application. Different from the above-mentioned embodiment, in the display panel 102, the color resists for filtering light are arranged on the first substrate 10, so that the first substrate 10 adopts the color-filter on array (COA) technology. Specifically, the first substrate 10 further includes a color resist layer 18, the color resist layer 18 is located in the first display area AA1, and the color resist layer 18 includes a red color resist, a green color resist, and a blue color resist. By disposing the color resist layer 18 on the first substrate 10, the notches 21 can be easily formed on the second substrate 20. Other descriptions can be referred to the above-mentioned embodiments, which will not be repeated herein for brevity.

Figure 7:
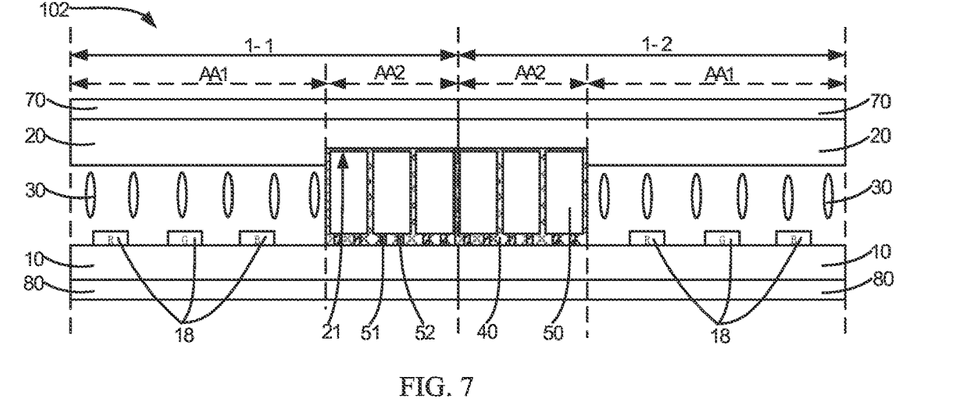
FIG. 7 is another schematic cross-sectional structure diagram of the display panel according to an embodiment of the present application.
Figure 8:
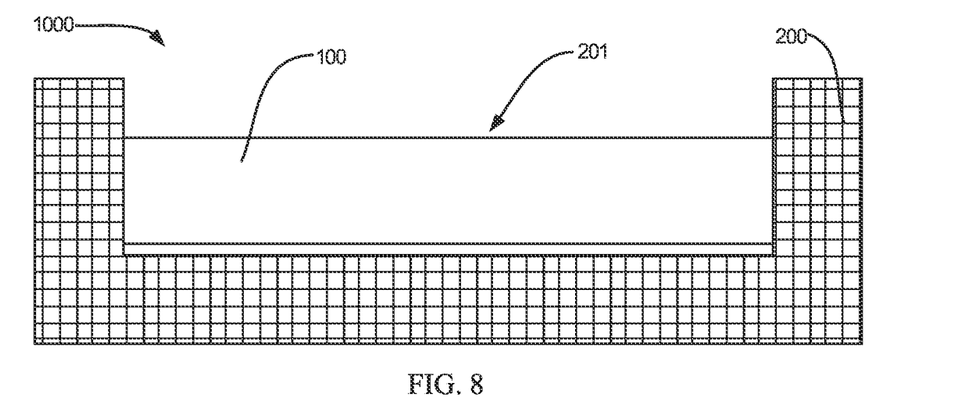
FIG. 8 is a schematic cross-sectional structure diagram of an electronic device according to an embodiment of the present application.

Based on the same inventive concept, an embodiment of the present application further provides an electronic device. Referring to FIG. 1 to FIG. 7 in combination, FIG. 7 is a schematic cross-sectional structure diagram of the electronic device provided by the embodiment of the present application. The electronic device 1000 includes a housing 200 and a display panel 100 according to one of the above embodiments, the housing 200 is formed with a second accommodating cavity 201, and the display panel 100 is assembled in the second accommodating cavity 201. The electronic device 1000 includes electronic products such as televisions and tablets.

According to the above embodiment, it is appreciated that:

In the display panel and the electronic device provided by the present application, the display panel includes at least two sub-boards spliced to each other, each of the sub-boards includes a first display area and a second display area disposed at the periphery of the first display area. Each of the sub-boards further includes a first substrate and a second substrate disposed opposite to each other, and a frame sealant and a liquid crystal layer located between the first substrate and the second substrate, the frame sealant surrounds the liquid crystal layer, wherein a plurality of light-emitting devices are arranged on the first substrate or the second substrate corresponding to the second display area, and the plurality of light-emitting devices can allow the second display area to display a picture, so as to eliminate the splicing gaps at the splicing positions, thus solving the problem of splicing gaps in the display splicing screens of the existing liquid crystal.

In the above embodiments, the descriptions of each embodiment have their own emphasis. The parts that are not described in detail in an embodiment can be referred to the detailed descriptions in other embodiments above, which will not be repeated herein for brevity.

The display panel and the display device provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A display panel, comprising at least two sub-boards spliced to each other, wherein each of the sub-boards comprises a first display area and a second display area arranged at a periphery of the first display area; and each of the sub-boards further comprises:
    a first substrate;
    a second substrate disposed opposite to the first substrate;
    a liquid crystal layer disposed between the first substrate and the second substrate, wherein the liquid crystal layer is disposed corresponding to the first display area;
    a plurality of light-emitting devices disposed on one of the first substrate and the second substrate and located in the second display area; and
    a frame sealant disposed between the first substrate and the second substrate, wherein the frame sealant surrounds the liquid crystal layer;
    wherein the second substrate is a second base, and a notch is provided in the second base facing the light-emitting devices and disposed in the second display area; and an end of the light-emitting devices close to the first substrate is bound on the first substrate, and another end of the light-emitting devices close to the second substrate is accommodated in the notch.

2. The display panel according to claim 1, wherein a number of pixels in the first display area distributed in a unit area is equal to a number of pixels in the second display area distributed in the unit area.

3. The display panel according to claim 2, wherein the first display area is provided with a plurality of first pixels, each of the first pixels comprises at least three first sub-pixels with different colors; the second display area is provided with a plurality of second pixels, each of the second pixels comprises at least three second sub-pixels with different colors, and an interval between adjacent ones of the second sub-pixels in a same one of the second pixels is equal to an interval between adjacent ones of the first sub-pixels in a same one of the first pixels.

4. The display panel according to claim 1, wherein the frame sealant is a transparent sealant, and the transparent sealant covers the plurality of light-emitting devices and is accommodated in the notches.

5. The display panel according to claim 4, wherein a transmittance of the frame sealant is greater than 60%.

6. The display panel according to claim 1, wherein the sub-boards further comprise an upper polarizer located on a side of the second substrate away from the first substrate, a lower polarizer located on a side of the first substrate away from the second substrate, an edge of the upper polarizer is flush with an edge of the second substrate, and an edge of the lower polarizer is flush with an edge of the first substrate.

7. The display panel according to claim 1, wherein each of the light-emitting devices has a first pole and a second pole; and the first substrate comprises:
 a first base;
 a thin film transistor disposed on the first base and located in the first display area; and
 a drive circuit disposed on the first base and located in the second display area, wherein the drive circuit comprises a first electrode and a second electrode, and the first electrode and the second electrode are arranged in a same layer with at least part of metal layers of the thin film transistor; and
 wherein the first electrode is electrically connected to the first pole of each of the light-emitting devices, and the second electrode is electrically connected to the second pole of each of the light-emitting devices.

8. The display panel according to claim 7, wherein the first substrate further comprises a color resist layer, the color resist layer is disposed on the first base, the second substrate further comprises a common electrode, and the common electrode is disposed on the second substrate and located in the first display area.

9. The display panel according to claim 7, wherein the thin film transistor comprises an active layer, a gate, a source and a drain, and a pixel electrode, the first electrode and the second electrode are disposed in a same layer as the pixel electrode.

10. The display panel according to claim 1, wherein the second substrate is an integrated structure, and a thickness of a portion of the second substrate corresponding to the notch is less than a thickness of a portion of the second substrate disposed in the first display area.

11. The display panel according to claim 1, wherein each of the sub-boards further comprises a backlight module disposed on a side of the first substrate away from the second substrate; the backlight module comprises a backboard, a plastic frame fixedly connected to the backboard, and an optical film disposed on the plastic frame; and a foam glue is fixedly disposed between the first substrate and the optical film;
 wherein a region where the plastic frame and the foam glue are located covers the light-emitting devices.

12. An electronic device, comprising a housing and a display panel, wherein the housing is formed with a first accommodating cavity, the display panel is assembled in the first accommodating cavity, the display panel comprises at least two sub-boards spliced to each other, each of the sub-boards comprises a first display area and a second display area arranged at a periphery of the first display area; and each of the sub-boards further comprises:
 a first substrate;
 a second substrate disposed opposite to the first substrate;
 a liquid crystal layer disposed between the first substrate and the second substrate, wherein the liquid crystal layer is disposed corresponding to the first display area;
 a plurality of light-emitting devices disposed on one of the first substrate and the second substrate and located in the second display area; and
 a frame sealant disposed between the first substrate and the second substrate, wherein the frame sealant surrounds the liquid crystal layer;
 wherein the second substrate is a second base, and a notch is provided in the second base facing the light-emitting devices and disposed in the second display area; and an end of the light-emitting devices close to the first substrate is bound on the first substrate, and another end of the light-emitting devices close to the second substrate is accommodated in the notch.

13. The electronic device according to claim 12, wherein a number of pixels in the first display area distributed in a unit area is equal to a number of pixels in the second display area distributed in the unit area.

14. The electronic device according to claim 13, wherein the first display area is provided with a plurality of first pixels, each of the first pixels comprises at least three first sub-pixels with different colors; the second display area is provided with a plurality of second pixels, each of the second pixels comprises at least three second sub-pixels with different colors, and an interval between adjacent ones of the second sub-pixels in a same one of the second pixels is equal to an interval between adjacent ones of the first sub-pixels in a same one of the first pixels.

15. The electronic device according to claim 12, wherein the frame sealant is a transparent sealant, and the transparent sealant covers the plurality of light-emitting devices and is accommodated in the notches.

16. The electronic device according to claim 15, wherein a transmittance of the frame sealant is greater than 60%.

17. The electronic device according to claim 12, wherein the sub-boards further comprise an upper polarizer located on a side of the second substrate away from the first substrate, a lower polarizer located on a side of the first substrate away from the second substrate, an edge of the upper polarizer is flush with an edge of the second substrate, and an edge of the lower polarizer is flush with an edge of the first substrate.

18. The electronic device according to claim 12, wherein each of the light-emitting devices has a first pole and a second pole; and the first substrate comprises:
 a first base;
 a thin film transistor disposed on the first base and located in the first display area; and
 a drive circuit disposed on the first base and located in the second display area, wherein the drive circuit comprises a first electrode and a second electrode, and the first electrode and the second electrode are arranged in a same layer with at least part of metal layers of the thin film transistor; and
 wherein the first electrode is electrically connected to the first pole of each of the light-emitting devices, and the second electrode is electrically connected to the second pole of each of the light-emitting devices.

19. The electronic device according to claim 18, wherein the first substrate further comprises a color resist layer, the color resist layer is disposed on the first base, the second substrate further comprises a common electrode, and the common electrode is disposed on the second substrate and located in the first display area.

20. The electronic device according to claim 18, wherein the thin film transistor comprises an active layer, a gate, a source and a drain, and a pixel electrode, the first electrode and the second electrode are disposed in a same layer as the pixel electrode.

* * * * *